(12) United States Patent
Vorontcov

(10) Patent No.: US 9,477,716 B2
(45) Date of Patent: Oct. 25, 2016

(54) METHOD OF AND SYSTEM FOR RANKING ELEMENTS OF A NETWORK RESOURCE FOR A USER

(71) Applicant: YANDEX EUROPE AG, Lucerne (CH)

(72) Inventor: Iurii Vitalievich Vorontcov, Saint-Petersburg (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/021,757

(22) PCT Filed: Jun. 6, 2014

(86) PCT No.: PCT/IB2014/062027
§ 371 (c)(1),
(2) Date: Mar. 14, 2016

(87) PCT Pub. No.: WO2015/049594
PCT Pub. Date: Apr. 9, 2015

(65) Prior Publication Data
US 2016/0224563 A1 Aug. 4, 2016

(30) Foreign Application Priority Data

Oct. 2, 2013 (RU) .............................. 2013144679

(51) Int. Cl.
*G06F 17/30* (2006.01)
*G06F 7/00* (2006.01)
*H04L 12/26* (2006.01)

(52) U.S. Cl.
CPC ..... *G06F 17/3053* (2013.01); *G06F 17/30528* (2013.01); *G06F 17/30598* (2013.01); *G06F 17/30867* (2013.01); *H04L 43/065* (2013.01)

(58) Field of Classification Search
CPC ..... G06F 17/211; G06F 17/248; G06F 17/24
USPC ....................................................... 707/728
See application file for complete search history.

(56) References Cited

U.S. PATENT DOCUMENTS

| | | | |
|---|---|---|---|
| 7,542,971 B2 * | 6/2009 | Thione | G06F 17/24 |
| 8,275,766 B2 * | 9/2012 | Ball | G06F 17/30867 707/727 |
| 8,402,054 B2 | 3/2013 | Frazier | |
| 8,898,161 B2 * | 11/2014 | Grant | G06F 17/30864 707/735 |
| 2007/0067297 A1 * | 3/2007 | Kublickis | G06Q 30/02 |
| 2011/0246906 A1 | 10/2011 | Catlin et al. | |
| 2011/0276411 A1 * | 11/2011 | McElfresh | G06Q 30/02 705/14.66 |

OTHER PUBLICATIONS

International Search Report from PCT/IB2014/062027, Young, Lee W., Jan. 13, 2015.
International Preliminary Report on Patentability, Boutah, Alina N., Nov. 24, 2015, Corrected version reissued Mar. 7, 2015.

* cited by examiner

*Primary Examiner* — Kuen Lu
(74) *Attorney, Agent, or Firm* — BCF LLP

(57) ABSTRACT

Method of and system for ranking elements of a first network resource for a first user, first network resource being hosted by a first server, method comprising, at a second server in communication with first server via a communications network: receiving an indication of elements from first server; receiving an indication of first user; based on at least one received indication, retrieving context information from a first database in communication with second server, context information being at least partially indicative of a relative relevance of elements to first user, context information including information about a past interaction of at least one of first user and a second user with a second network resource, second network resource being distinct from first network resource; and based at least in part on context information, determining at least one of a ranking of elements by relevance to first user and a most relevant element.

28 Claims, 5 Drawing Sheets

METHOD OF AND SYSTEM FOR RANKING ELEMENTS OF A NETWORK RESOURCE FOR A USER

CROSS-REFERENCE

The present application claims convention priority to Russian Utility Model Application No. 2013144679, filed on Oct. 2, 2013, entitled "СПОСОБ И СИСТЕМА РАНЖИРОВАНИЯ ЭЛЕМЕНТОВ СЕТЕВОГО РЕСУРСА ДЛЯ ПОЛЬЗОВАТЕЛЯ". This application is incorporated by reference herein in its entirety.

FIELD

The present technology relates to methods of and systems for ranking elements of a network resource for a user, the network resource being hosted by a server in communication with another server.

BACKGROUND

Internet users today have a vast breadth of network resources at their disposal, including web pages, streaming media, messaging services, and social networks, just to name a few. While this may be a boon for users, it is also a challenge for purveyors of content seeking a captive audience. With so many network resources to choose from, users are liable to have a short attention span, making it critical for content producers to present their content in the most appealing way possible.

According to the conventional approach, the content and style of a network resource have been designed with an anticipated audience in mind. The designer of the network resource selects both the content and the presentation style he or she believes to be most appropriate for the variety of users expected to navigate to the network resource. For example, consider the design of an official web page for the US Open Tennis Championships to which a variety of presentation styles may be applied. Conventionally, a web designer is likely to adopt a generic presentation style expected to appeal to a broad cross-section of tennis fans. Such a generic presentation style may not appeal to excitable young tennis players as much as one featuring bright colors, fast-moving graphics, and a rock music soundtrack, nor may it appeal to long-time followers of the tennis circuit as much as a presentation style featuring traditional graphics, photos of tennis legends of the past thirty years, and a Gershwin soundtrack, but neither is a generic presentation style likely to displease either cohort. In the absence of knowledge about the preferences of the visitor, it is reasonable to adopt the generic style so as not to displease anyone.

More recently, some content providers have proposed methods for customizing content for particular users. In particular, advertisers paying to have their advertisements displayed either alongside or embedded in the content have been seeking ways to increase the likelihood that such advertisements will result in sales of the products or services advertised. One approach for increasing the probability of such so-called "conversions" is disclosed in US Patent Publication No. 2011/0246906 "Using Visitor Context And Web Page Features To Select Web Pages For Display", invented by Catlin et al. (hereinafter "Catlin"). A method disclosed therein includes selecting, based on a current-visitor context, a particular one of multiple possible instances of a web page for presentation to the current visitor, the particular one being that substantially most likely to generate a highest expected outcome from interaction with the web page by the current visitor as indicated by the current-visitor context. The method in Catlin thus enables monitoring of session data in respect of visitors to a web page and selection of a version of the web page anticipated to be substantially most likely to generate a highest expected outcome with respect to the user (e.g. inciting a sale).

Thus, continuing the example of the US Open Tennis Championships web page, implementations of Catlin may use information collected about the current visitor such as his or her age in order to select a version of the web page targeted either to a younger or older audience. The method in Catlin thus improves upon conventional approaches wherein a single pre-designed version of a web page is presented to all users irrespective of their demographic profile or past interactions with that web page.

However, the approach in Catlin suffers from its reliance on session data involving interactions with the web page to be optimized. Until a user has interacted sufficiently with a web page, it may be difficult to determine which version to select for a user until he or she has interacted with the web page sufficiently to assess his or her preferences, or to liken that user to another user who has interacted sufficiently with the web page to make the assessment by analogy.

Furthermore, Caitlin is limited in that they do not enable customization of the content or style of a network resource for a particular user upon that user's first visit, owing to their reliance on information regarding interactions with that network resource.

SUMMARY

While techniques disclosed in the prior art improve upon the conventional one-size-fits-all approach, there remains substantial room for improvement. It is thus an object of the present technology to ameliorate at least some of the inconveniences present in the prior art and to provide improved ranking of elements of network resources for particular users.

In particular, when ranking the elements of a network resource for a user, the present technology makes use of context information including information about past interactions either of the user or of a different user with another, distinct network resource, that is, a network resource other than that in respect of which the elements are to be ranked. Thus, again continuing the US Open Tennis Championships web page example introduced above, a server implementing the present technology may take into account a past interaction of the user with a smartphone-based movie review application wherein the user chose to read a movie review of Woody Allen's film "Match Point" rather than watch a trailer for the latest superhero action movie, such interaction perhaps being suggestive of a preference for a traditional presentation style rather than a flashy presentation style for the US Open web page.

As the above example suggests, past interactions with a second network resource may be at least partially indicative of a relative relevance to the user of elements of a first network resource, despite substantial differences between the two network resources (one being a movie review application and the other being a tennis website). It is the indicative value of such past interactions with network resources other than that in respect of which elements are to be ranked that some embodiments of the present technology seeks to capture and utilize.

Moreover, the present technology envisions the provisioning of ranking services by at least one server in respect of network resource elements hosted by at least one other server. In this way, a specialized server or plurality of servers implementing the present technology could effect ranking of elements of one or more network resources hosted by one or more other servers.

Thus, in one aspect, various implementations of the present technology provide a method of ranking elements of a first network resource for a first user, the first network resource being hosted by a first server, the method comprising, at a second server in communication with the first server via a communications network:

receiving an indication of the elements from the first server;
receiving an indication of the first user;
based on at least one of the indication of the elements and the indication of the first user, retrieving context information from a first database in communication with the second server, the context information being at least partially indicative of a relative relevance of the elements to the first user, the context information including information about a past interaction of at least one of the first user and a second user with a second network resource, the second network resource being distinct from the first network resource; and
based at least in part on the context information, determining at least one of a ranking of the elements by relevance to the first user and a most relevant one of the elements;

In some implementations, the ranking of the elements and/or the indication of the most relevant one having been determined is stored in a structured collection of data so as to facilitate subsequent retrieval. Thus, some implementations of the present technology further comprise storing an indication of at least one of the ranking and the most relevant one of the elements in a second database in communication with the second server.

In some implementations, the first server (which hosts the first network resource) sends an explicit request to the second server for a ranking of the elements of the first network resource and/or an indication of which element is most relevant to the user. Thus, in some implementations, the method at the second server further comprises:

receiving a request from the first server for an indication of at least one of the ranking and the most relevant one of the elements; and
sending the indication requested in the request to the first server.

In some further implementations, the ranking process is effected only upon request of the first server, such that in some implementations the receiving of the request is effected at the second server before the determining of the ranking of the elements and/or of the element most relevant to the user. In some further implementations, the ranking request is sent by the first server to the second server because the first user has requested the first network resource from the first server. For example, a first server hosting the US Open Tennis Championship web page may receive a request to access the page from a user. In order to determine which version of the web page to present to the user, the first server may send a request to the second server for an indication of which version of the page is the most relevant to the user. Thus, in some further implementations, the receiving of the request at the second server is a consequence of the first server having itself received a request in respect of the first network resource from the first user. The request from the first server may also include an indication of the elements to be ranked and an indication of the first user, such that, at the second server, the receiving of the indication of the elements, the receiving of the indication of the first user, and the receiving of the request for an indication of at least one of the ranking and the most relevant one of the elements, occur concurrently.

In other further implementations, the second server effects the determining of at least one of the ranking and the most relevant element before receiving the request from the first server for the indication of the ranking and/or the most relevant element. As a non-limiting example, the second server may actively crawl the Internet, downloading various network resources, each network resource comprising a plurality of elements, and determine a ranking of those elements with regard to one or more prospective users in anticipation of a potential request from one of those users to access those network resources. The result could be stored in a database in communication with the second server, ready to be retrieved quickly when needed. Thus, in some further implementations, the determining of the ranking of the elements and/or of the most relevant element is effected at the second server before the receiving of the request from the first server.

In some implementations, information about a past interaction of a user other than the first user with a network resource other than the first network resource may be used to inform the process of ranking the elements of the first network resource for the first user. To illustrate this, let us again consider the US Open web page example, wherein at least two different versions of the web page could be presented to a first user, one expected to appeal to young users and another expected to appeal to older users. In the absence of a demographic profile for the first user, it is difficult to choose between the young and old versions of the web page. However, an estimate of the first user's may be obtained by comparing his or her past interactions with a second network resource to those of a second user known to be 58 years old. Perhaps the second network resource is a shopping website, and both the first user and the second user purchased the same music album from that website. While not a perfect indication that the first user is in the same age bracket as the second user, their common taste in music may be at least partially indicative of a proximity in age, and therefore at least partially indicative of a greater relevance of the version of the US Open web page targeted to an older audience. Thus, in some implementations, the context information includes information about a past interaction of the second user with the second network resource.

In some implementations, the context information does not include information about a past interaction of the first user with the second network resource. In such cases, unlike in the example given above, there is no common behavioral link to be made between the first user and the second user in regard of their past interactions with a second network resource. Instead, two different scenarios are envisioned. In one case, a different type of link between the first user and the second user may be known, such as, as a non-limiting example, the fact that both the first user and the second user are accessing the first network resource using a same client device, perhaps the same model of smartphone. While it may not be readily known that users of that smartphone model tend to be either older or younger, the second server may estimate, based on context information including past interactions of the second user with a second network resource (perhaps a movie review website), that the second user is a teenaged girl. Because the first user is accessing the first network resource using the same model of smartphone, the a posteriori probability that the first user is also a teenaged girl increases. The past interactions of the second user with the second network resource are at least partially indicative of a relative relevance of the elements of the first network resource to the first user, at least when combined with the knowledge that the first user and the second user use the same client device.

Even when no link may be established between the first user and the second user and the context information does not include information about a past interaction of the first user with the second network resource, the past interactions of a second user with a second network resource may nonetheless be at least partially indicative of a relative relevance of the elements of the first network resource. In such case, however, the indicative value of such past interactions would not be particular to the first user, being the same in respect of any user. For example, the past interactions of a second user with a used car website comprising photos of black cars and photos of red cars may be at least partially indicative that photos of red cars are more likely to attract attention than photos of black cars. On the basis of this information, the second server may rank web pages displaying red cars ahead of web pages displaying black cars, irrespective of the user in respect of whom the ranking is performed.

The elements of the first network resource to be ranked may consist of different types of objects. As non-limiting examples, the elements could be links to network resources, components or aspects of a web page, different web pages, different styles applicable to one or more web pages (possibly including a visual arrangement of graphical objects), or indications of any of the foregoing. Thus, in some implementations, each one of the elements is a uniform resource locator (URL). In some implementations, the first network resource is a website and each one of the elements is an indication of a distinct web page. In come implementations, the first network resource is a web page and each one of the elements is an indication of at least one of a displayable element and an audible element of the web page. In some implementations, the first network resource is a web page and each one of the elements is an indication of a style applicable to the web page. In some implementations, each one of the elements includes an indication of a graphical layout. In some such implementations wherein the first network resource is a web page, the method further comprises sending to the first server an indication of a web page customized for the first user based on the ranking of the elements. Thus, for example, a customized web page may be built for the first user by the second server, and either the web page or a link to the web page may be sent to the first server.

In some implementations, the second network resource is hosted on the first server, as is the first network resource. In other implementations, the second network resource is hosted on a third server being distinct from the first server. In some further implementations, the second network resource is a search engine. In some such implementations, the past interaction includes a submission of one or more search queries. Such search queries may have been submitted to the search engine by the first user and/or a second user. Such search queries may include search terms indicative of an attribute, behavior, or preference of the user having submitted them, or any other at least partial indication of a relative relevance to the first user of the elements of the first network resource In some implementations, the past interaction includes a selection, by at least one of the first user and the second user, of a first element of the second network resource instead of a second element of the second network resource. For example, if the second network resource is a search engine, the past interaction may be the selection of a first search result instead of a second search result.

In some implementations, the second network resource is substantially different from the first network resource. Some of the examples given above are illustrative of the potential indicative value of substantially different network resources. In other cases, however, the indicative value of interactions with a substantially different second network resource for the ranking of elements of the first network resource may be unintuitive. For example, the first network resource may be a website about cats and the second network resource may be an online bicycle repair manual. While unexpected, it may well be the case, for example, that users who spend more time navigating the online bicycle repair manual are more likely to prefer long-haired cats than those who spend less time navigating the online bicycle repair manual. While such hidden correlations are unintuitive, the utilization of precisely such hidden correlations is one advantage of the present technology over the prior art of record.

A variety of techniques for teasing out such hidden correlations in data sets are known to those skilled in the art. One category of such techniques are machine-learning techniques, which may be used to train a function in accordance with a set of training data. Non-limiting examples of machine learning techniques include neural networks, Bayesian inference networks, decision trees, support vector machines, and reinforcement learning. In what is known as supervised learning, the training data include a series of input values and known correct output values, and the function is trained to map input values to the correct output values as closely and as frequently as possible. During the training of the function, any difference between the output computed by the function and the known correct output value causes the function to be adapted so as to subsequently be more likely to compute the correct output value. In some implementations of the present technology, the determining of the ranking and/or the most relevant one of the elements of the first network may include executing a function on a processor of the second server, the function having been trained using a machine-learning technique. In some further implementations, the method further comprises training the function using the machine-learning technique before the determining step. In other implementations, the method further comprises receiving the function from another server having trained the function using the machine-learning technique.

Some implementations of the present technology may also make use of a relative ranking of the first network resource relative to another network resource, based on one or more criteria. For example, when ranking different versions of a first web page, the fact that the web page is more frequently visited by women than another web page may be taken into account. Thus, in some implementations of the present technology, the context information further includes a ranking of the first network resource relative to a third network resource according to a criterion.

In some such implementations, the criterion is a search engine ranking criterion, according to which a search engine may rank one network resource ahead of another network resource in a set of search results. In some such implementations, the method further comprises analyzing the ranking of the first network resource relative to the third network resource based on search history statistics.

In some implementations, the ranking of the elements of the first network resource is effected not in respect of a single user, but in respect of a plurality of users all of whom are believed to have at least one attribute in common. Thus, in some implementations, the first user is part of a set of users estimated to share a same attribute. The attribute in question could include one or more demographic properties, past behavior, geographic location, or any other attribute believed to be shared by the plurality of users. Thus, in some implementations the attribute includes at least one of an estimated demographic profile, an estimated past behavior, and an estimated proximity to a geographic location.

In some implementations, the indication of the user is an indication of a client device of the user. Thus, in some implementations, ranking of network resource elements may be effected at least partially on the basis of properties of the client device. In some such implementations, the indication of the client device includes an internet protocol (IP) address of a network interface of the client device. In some such implementations, the indication of the client device includes an indication of at least one of a manufacturer, model, hardware attribute, and software attribute of the client device. In some such implementations, the hardware attribute includes at least one of a size and a resolution of a display of the client device. In some such implementations, the software attribute includes at least one of an operating system of the client device, an application installed on the client device, and a user setting of at least one of the operating system and the application. In some such implementations, the user setting includes an indication of at least one of a geographical region and a language.

In some implementations, the indication of the user includes a user identifier for use with an online service. As non-limiting examples, the user identifier could be a TWITTER™ or FACEBOOK™ username of the user. In some implementations, the online service includes a search engine. In such implementations, the user identifier could be a username or other unique ID linking the user to a particular history of search queries submitted to a search engine and/or a particular history of interactions with search results and/or search engine result pages. Thus, in some implementations, the user identifier enables the search engine to retrieve information about the past interaction of the first user with the second network resource. In some implementations, the online service includes an email service and the indication of the user includes an email address of the user.

Other aspects of the present technology include a server structured and configured to effect the method as well as a non-transitory computer-readable information storage medium storing program instructions for effecting the method. Thus, in one aspect, various implementations of the present technology provide a server for ranking elements of a first network resource for a first user, the first network resource being hosted by a hosting server, the server comprising:

- a communication interface structured and configured to communicate with the hosting server via a communications network;
- at least one computer processor operationally connected with the communication interface and structured and configured to:
  - receive an indication of the elements from the hosting server;
  - receive an indication of the first user;
  - based on at least one of the indication of the elements and the indication of the first user, retrieve context information from a first database, the context information being at least partially indicative of a relative relevance of the elements to the first user, the context information including information about a past interaction of at least one of the first user and a second user with a second network resource, the second network resource being distinct from the first network resource; and
  - based at least in part on the context information, determine at least one of a ranking of the elements by relevance to the first user and a most relevant one of the elements.

In another aspect, various implementations of the present technology provide a non-transitory computer-readable information storage medium storing program instructions that, when executed by a computer processor of a server in communication via a communications network with a hosting server hosting a first network resource, effect:

- receiving an indication of elements of the first network resource from the hosting server;
- receiving an indication of a first user in respect of whom the elements are to be ranked;
- based on at least one of the indication of the elements and the indication of the first user, retrieving context information from a first database in communication with the server, the context information being at least partially indicative of a relative relevance of the elements to the first user, the context information including information about a past interaction of at least one of the first user and a second user with a second network resource, the second network resource being distinct from the first network resource; and
- based at least in part on the context information, determining at least one of a ranking of the elements by relevance to the first user and a most relevant one of the elements.

In the context of the present specification, a first device should be understood to be "in communication with" a second device if each of the devices is capable of sending information to and receiving information from the other device, across any physical medium or combinations of physical media, at any distance, and at any speed. As a non-limiting example, the first device and second device may communicate over a computer network such as the Internet. As another non-limiting example, the two devices may run on the same digital electronic hardware, in which case communication between the devices may occur by any means available on such digital electronic hardware, such as inter-process communication.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the present context a "search engine" should be understood to comprise the software elements or digital electronic devices necessary to carry out the functions of a search engine system. In various implementations of above aspects, the search engine may thus comprise any number of digital electronic devices.

In the context of the present specification, a "search query" is information that a search engine takes into account in respect of a search to be carried out in order to provide the user with the information that the user is seeking to obtain through the search. Each piece of information is a search query element. Search queries may include a variety of search query elements, including, but not limited to, one or more "search terms" (e.g. words, letters, numbers, characters, etc.), the IP address of the client device, the geographic location of the client device, the (presumed) language of the search term(s), a search account associated with the (presumed) user of the client device, and the application that the user is using on the client device in respect of the search. Although the user may or may not be aware of the various search query elements included within their search query, the inclusion of various search query elements helps to provide the user with the information that they are seeking to obtain through the search. In the present context no particular number or type of search query elements is generally required, although typically, the more search query elements provided to the search engine, the better the search results.

It should be understood that not all search query elements in respect of a search need be sent by a user to a search engine. For example, some search query elements may be determined by the search engine itself (or by some associated system), be it from the search query elements sent to the search engine, or otherwise. Other search query elements may be stored information retrieved by the search engine, or information derived from stored information retrieved by the server.

In the context of the present specification, "search results" are the results of a search performed by a search engine, irrespective of the manner in which those results were obtained. (There are many ways of carrying out a search, and the present technology is not restricted to any particular method.)

In the context of the present specification, "information" includes information of any nature or kind whatsoever capable of being stored as binary data. Thus information includes, but is not limited to audiovisual works (pictures, movies, sound records, presentations etc.), data (location data, numerical data, etc.), text (opinions, comments, questions, messages, etc.), documents, spreadsheets, etc.

In the context of the present specification, an "indication of" a datum may be the datum itself or a pointer, reference, link, or other indirect mechanism enabling the recipient of the indication to locate a network, memory, database, or other computer-readable memory location from which the datum may be retrieved. For example, an indication of a web page could include all of the content of the webpage itself, such as one or more hypertext markup language files, image files, style sheets, scripts and any number of other related files, or it could be a uniform resource locator pointing to a network location where the web page may be accessed, or some other means of directing the recipient of the indication to a network location, memory address, database table, or other location where the web page may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient of that an indication of a datum will take the form of a database key for an entry in a particular table of a predetermined database containing the datum, then the sending of the database key is all that is required to effectively convey the datum to the recipient, even though the datum itself was not transmitted as between the sender and the recipient of the indication.

In the context of the present specification, "context information" refers to any information retrievable from a database which is at least partially indicative of relative relevance of the elements to the first user.

In the context of the present specification, the meaning of "relevance" may vary across implementations or within any one implementation. As non-limiting examples, the "relevance" of a network resource element to a user could refer to the expected likelihood that the user would notice, view, select, interact with, navigate to, enjoy, or otherwise consume that element.

In the context of the present specification, a "client device" is an electronic device that is under the control of a user and is capable of requesting and receiving network resources. As an example, client devices include personal computers, tablets, smartphones, mobile communication devices, and other devices that can send and receive data over a network. A client device typically includes user applications, such as a web browsers or program applications (colloquially known as "apps"), to facilitate the sending and receiving of data over a network. A web browser, for example, typically can enable a user to generally display and interact with text, images, videos, music and other information typically located on a web page at a website on the World Wide Web or a local area network. An app is typically more specialized and limited in its capabilities.

In the context of the present specification, a "server" is a combination of computer hardware and computer software capable of receiving information from client devices and/or other servers over a communications network. The hardware may be one physical computer or a plurality of physical computers acting in concert, but neither is required to be the case with respect to the present technology.

In the context of the present specification, a "network resource" is any data or collection of data that can be provided by a publisher over a network and that is associated with a network resource address. Non-limiting examples of network resources include HTML pages, documents, images, video, feed sources, as well as pluralities of files such as the foregoing. Network resources may include content, such as words, phrases, pictures, and so on, and/or embedded information such as metadata, hyperlinks and/or embedded instructions (such as JavaScript scripts).

In the context of the present specification, the expression "non-transitory computer-readable information storage medium" is intended to include volatile and non-volatile memory of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first graphical object" and "third graphical object" is not intended to imply any particular order, type, chronology, hierarchy or ranking (for example) of/between the graphical objects, nor is their use (by itself) intended imply that any "second graphical object" must necessarily exist in any given situation. Further, as is discussed herein in other contexts, reference to a "first" element and a "second" element does not preclude the two elements from being the same actual real-world element. Thus, for example, in some instances, a "first" graphical object and a "second" graphical object may be the same graphical object, and in other cases they may be different graphical objects.

In the context of the present specification, certain claim elements have been labeled with letters "(a)", "(b)", "(c)", etc. These labels have been used only for ease of reference to the claim elements to which they refer, and not for the purpose of describing any particular relationship between those claim elements. The alphabetical nature of these labels is not intended to necessarily imply any particular order, chronology, hierarchy or ranking between the claim elements. Thus, for example, depending on the implementation, it may be that a method claim element with the label "(h)" may occur before, after, or simultaneously with a method claim element with the label "(c)".

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
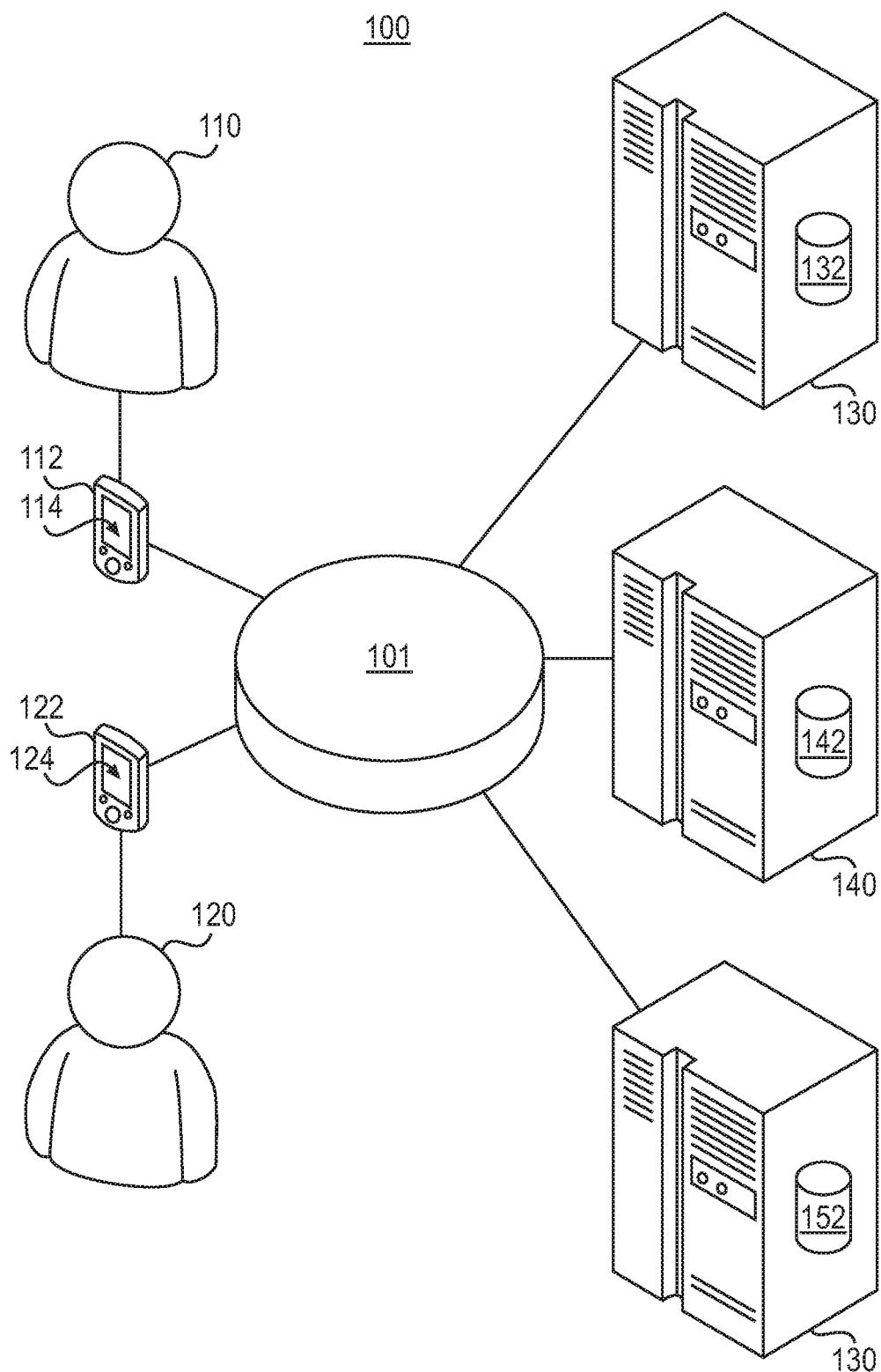
FIG. 1 is a context diagram of a computing environment suitable for use with implementations of the present technology described herein.

FIG. 1 shows a context diagram of a computing environment 100 suitable for use with implementations herein. A first user 110 employs a first smartphone 112 having a touchscreen display 114 suitable for rendering a mobile news application 300 (as described below with reference to FIG. 3) and a second user 120 employs a second smartphone 122 having a touchscreen display 124. Each of the smartphones 112 and 122 has installed thereon an operating system which includes a set of user settings, the user setting including a selection of languages for a virtual keyboard which may be shown on the respective display 114 or 124 of the smartphone 112 or 122. It should be expressly understood that smartphones 112 and 122 have been provided as examples only. In alternative embodiments, the smartphones 112 and 122 can be embodied in any suitable communication devices (i.e. any type of a client device), such as personal computers, tablets, smartphones, mobile communication devices, and other devices that can send and receive data over a network.

Each of the smartphones 112 and 122 is in communication with a web-based news server 130 and a search engine 140 via the Internet 101. News server 130 is structured and configured to serve news content from its database 132 to any client device running the mobile news application 300 (shown in FIG. 3), such as smartphone 112. Search engine 140 performs some of the following tasks: indexes the web, keeps a database of indexed web pages, receives search queries, performs web searches, categorizes search results into different categories, and responds to search queries received from users with search results such as those shown on search engine results page 200 (shown in FIG. 2). Search engine 140 keeps records of search queries submitted and subsequent interactions with the search results in a database 142. Each of news server 130 and search engine 140 is in communication via the Internet 101 with a ranking server 150. Ranking server 150 implements the present technology and stores determined rankings in a database 152.

It is to be expressly understood that ranking server 150 is merely one implementation of the present technology. Thus, the descriptions thereof that follow are intended to be only illustrative examples of the present technology. These descriptions are not intended to define the scope or set forth the bounds of the present technology. In some cases, what are believed to be helpful examples of modifications to ranking server 150 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case.

Figure 2:
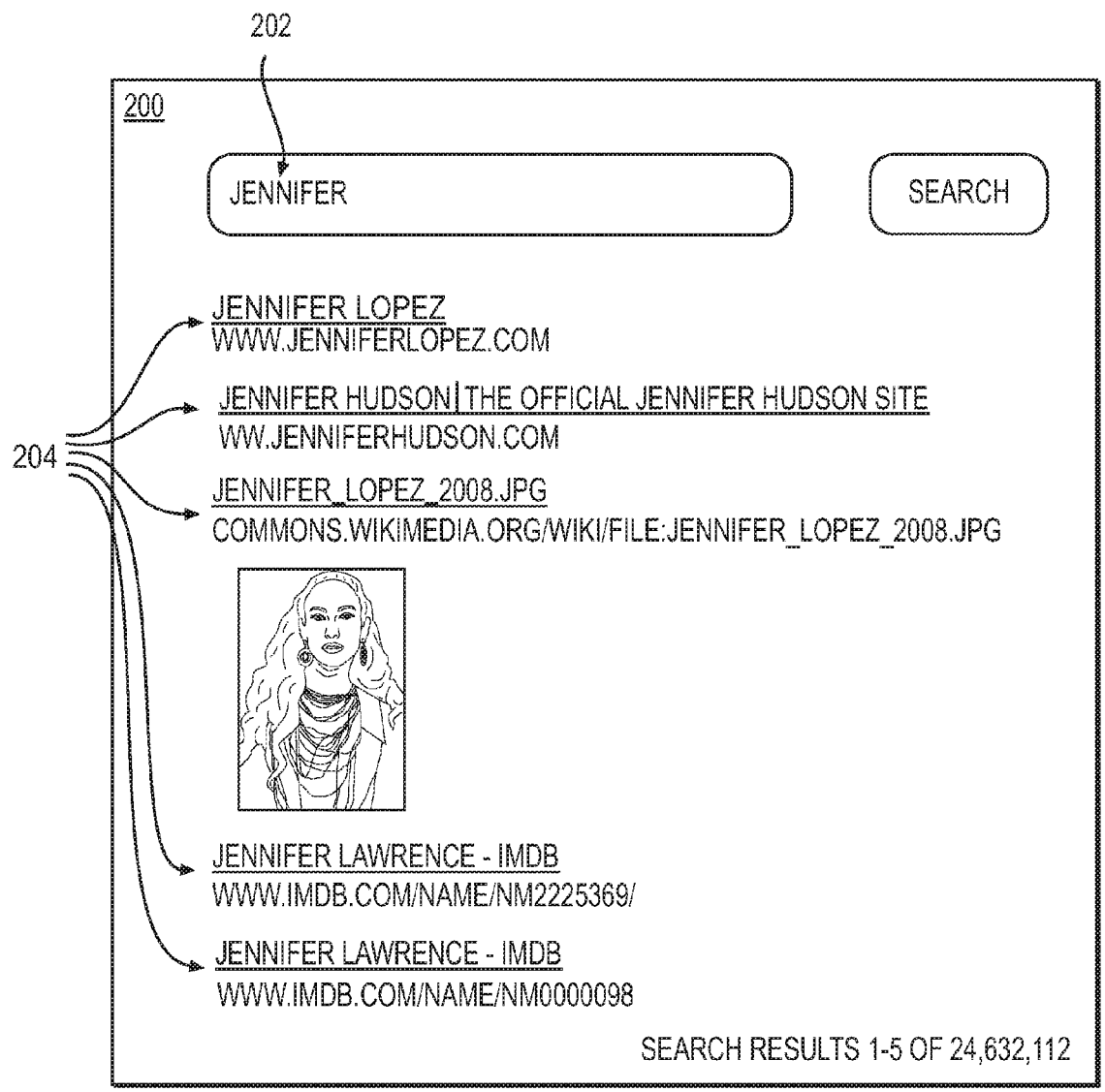
FIG. 2 is an example of a search engine results page displaying various search results in response to a search query.

FIG. 2 shows a search engine results page 200 of search engine 140 (shown in FIG. 1) including search results 204 being displayed as a result of the submission of a search query 202.

Figure 3A:
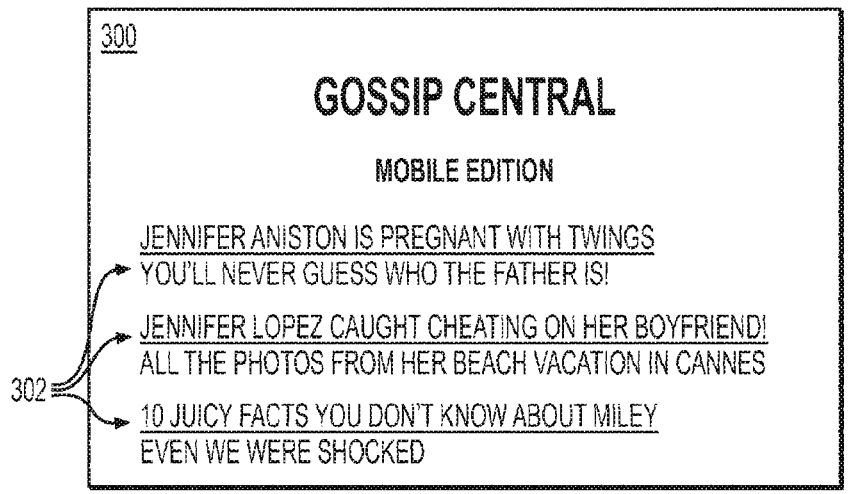
FIGS. 3A to 3C are examples of different presentations of a mobile news application.
Figure 3B:
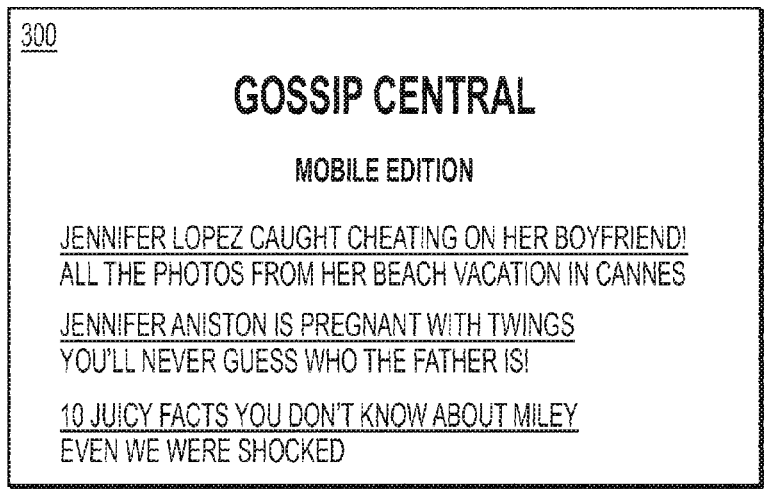
Figure 3C:
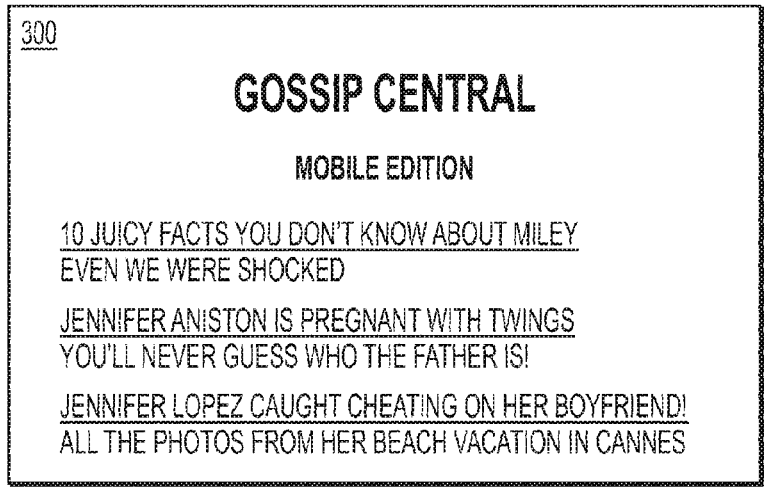

FIGS. 3A to 3C illustrate three possible orderings of links to news stories 302 displayed by mobile news application 300.

Figure 4:
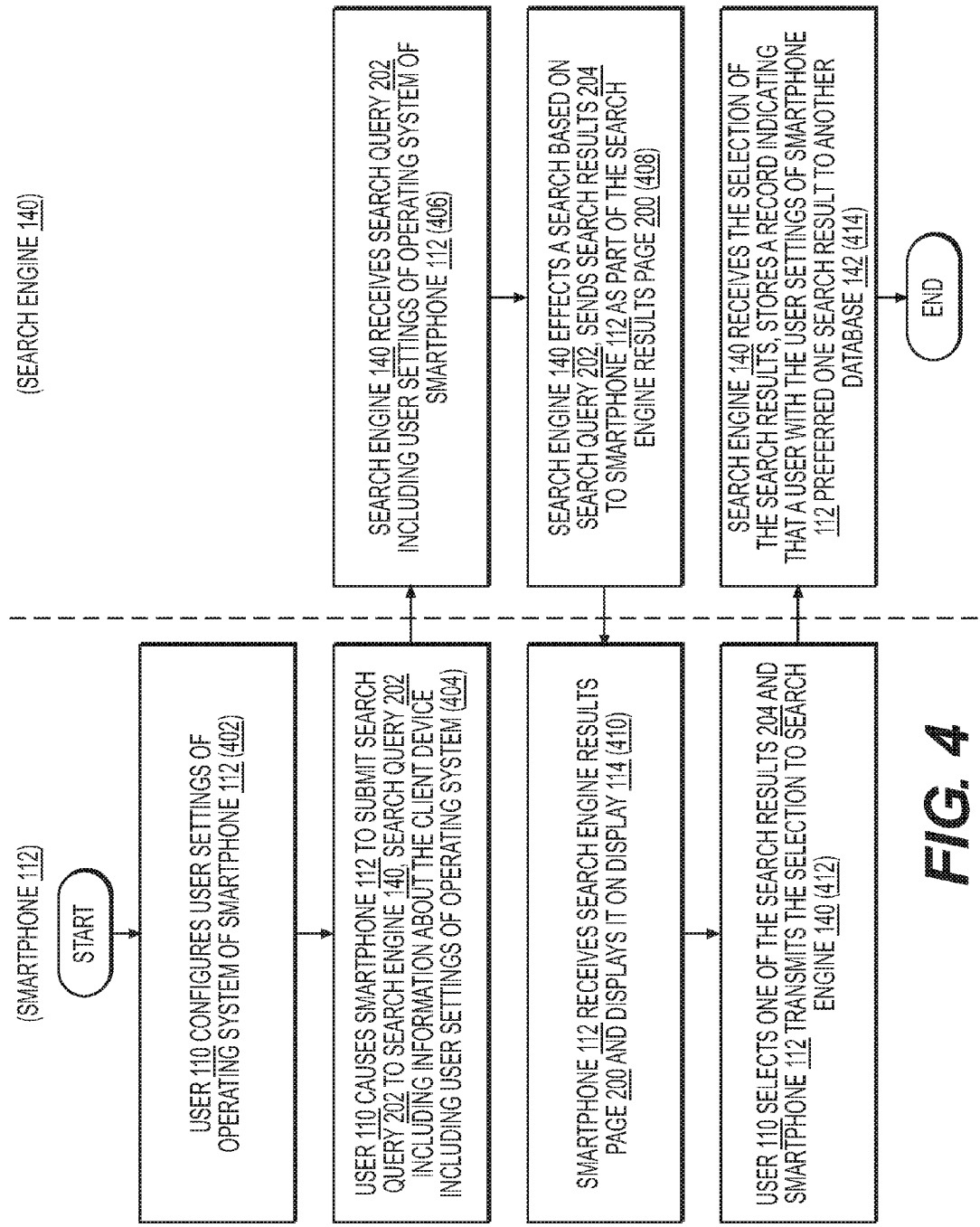
FIG. 4 shows a flowchart of a series of steps carried out to record context information in a database, the context information including an interaction of a second user with a search engine.
Figure 5:
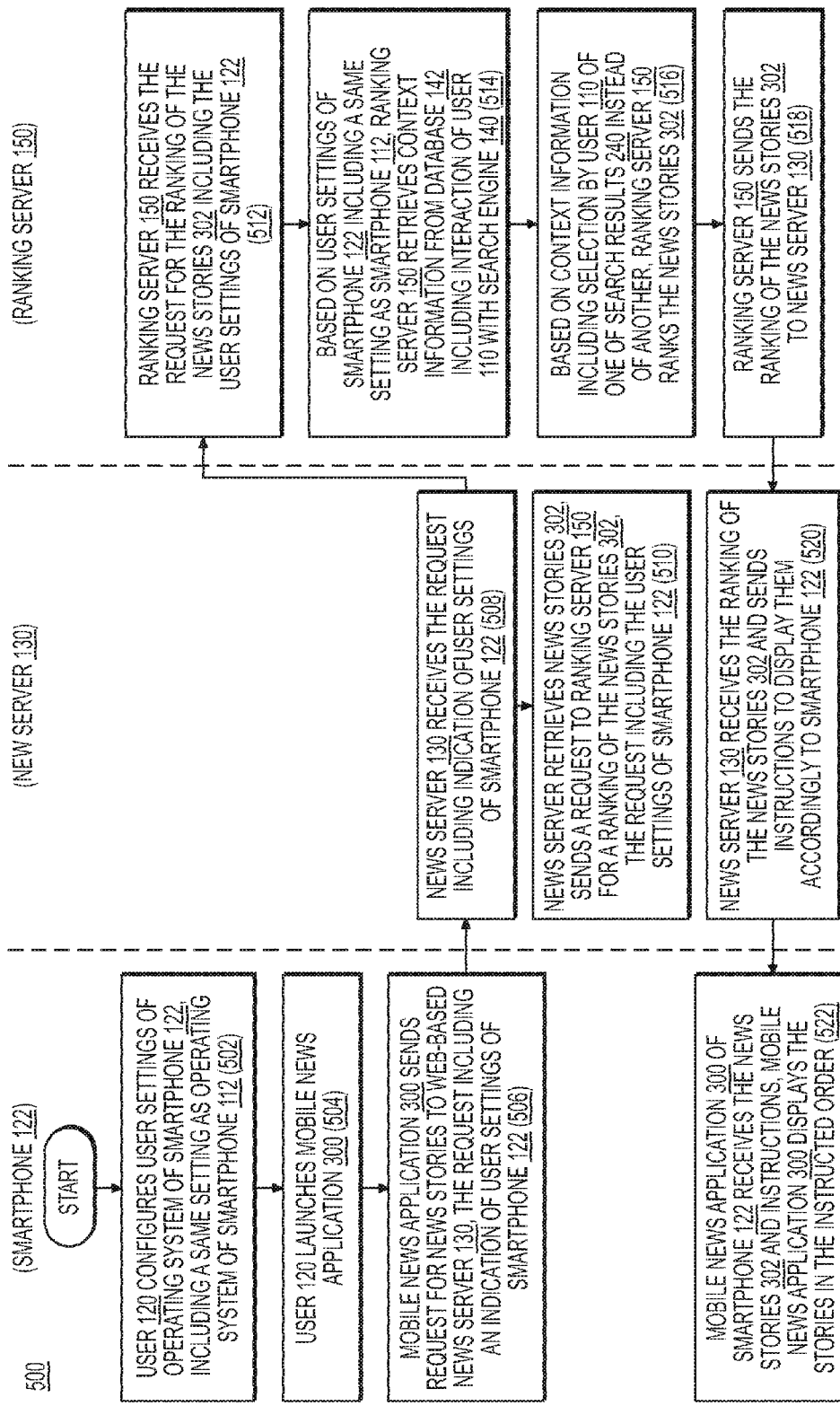
FIG. 5 shows a flowchart of a series of steps carried out to rank elements of a news application for a first user of the application based on context information retrieved from a database, the context information including the interaction of the second user with the search engine.

FIGS. 4 and 5 are flowcharts illustrating two series of steps related to one another. First, in FIG. 4, context information about an interaction of user 110 with search engine 140 is stored in database 142. Then, in FIG. 5, the context information is used by the ranking server 150 in order to determine a ranking of elements of mobile news application 300 for user 120.

At step 402, user 110 configures user settings of the operating system of smartphone 112. For example, the user settings may include the installation of a Spanish-language virtual keyboard displayable on touchscreen display 114 of smartphone 112 and allowing user 110. At step 404, user 110 causes smartphone 112 to submit a search query 202 with just one search, "Jennifer", to search engine 140 over the Internet 101. Along with the search term, the search query 202 includes information about user settings of the operating system of smartphone 112, such as the fact that a Spanish-language keyboard is installed.

At step 406, search engine 140 receives the search query 202. At step 408, the search engine 140 effects a search based on the search query 202 and sends the search results 204 to smartphone 112 as part of a search engine results page (SERP) 200 (see FIG. 2). At step 410, smartphone 112 displays the SERP on its display 114, the search results including two related to Jennifer Lopez and one related to Jennifer Aniston (see FIG. 2). At step 412, user 110 selects one of the Jennifer Lopez search results and smartphone 112 transmits the selection to search engine 140. At step 414, search engine 140 receives the selection of the Jennifer Lopez search result, and stores a record in database 142 including an indication that a user of a device with a Spanish-language virtual keyboard installed selected a Jennifer Lopez search result instead of a Jennifer Aniston search result.

In FIG. 5, a different user of a different device interacts with a different network resource relative to those in FIG. 4. At step 502, user 120 configures user settings of the operating system of smartphone 122. Like user 110, user 120 also installs a Spanish-language virtual keyboard. At step 504, user 120 launches the mobile news application 300 installed on smartphone 122. At step 506, mobile news application 300 requests news stories from news server 130, which could be a web-based news server affiliated with the mobile news application 300. The request includes an indication of user settings including an indication that a Spanish-language virtual keyboard is installed. At step 508, news server 130 receives the request from smartphone 122. At step 510, news server 130 retrieves news stories 302, perhaps from its database 132, and sends a request to ranking server 150 for a ranking of the news stories 302, the request including an indication of user 120 being the user settings of the operating system of smartphone 122.

At step 512, ranking server 150 receives the request for the ranking of the news stories 302. At step 514, ranking server 150 requests and receives context information from database 142 (which is a database of search engine 140 in the present implementation) based on the indication of user 120 received from news server 130, the indication of the user being the user settings of the operating system of smartphone 122. Because those user settings include a same setting (the fact a Spanish-language keyboard is installed) as those of smartphone 112, ranking server 150 retrieves context information including information about the interaction of user 110 with search engine 140. At step 516, based on the selection of the Jennifer Lopez search result instead of the Jennifer Aniston search result by user 110 at step 412 of FIG. 4, ranking server 150 ranks the news stories 302 in the order shown in FIG. 3B, with a news story about Jennifer Lopez taking precedence over a news story about Jennifer Aniston. At step 518, ranking server 150 sends the determined ranking of the news stories 302 to news server 130 as requested. At step 520, news server 130 receives the ranking of the news stories 302 and sends an indication of the ranking along with the news stories themselves to smartphone 122. At step 522, smartphone 122 receives the news stories 302 and the indication of the ranking and mobile news application 300 displays the news stories 302 to user 120 according to the ranking determined by ranking server 150.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A method of ranking elements of a first network resource for a first user, the first network resource being hosted by a first server, the method comprising, at a second server in communication with the first server via a communications network:
   (a) receiving an indication of the elements from the first server;
   (b) receiving an indication of the first user;
   (c) based on at least one of the indication of the elements and the indication of the first user, acquiring information about a past interaction of the first user with a second network resource, the second network resource being distinct from the first network resource;
   (d) based on the information about the past interaction, generating a first context information associated with the first user;
   (e) based on the first context information associated with the first user, determining a second user, the second user associated with a second context information that matches, at least partially, the first context information; the second context information containing a relevancy factor that is not contained within the first context information; and
   (f) based at least in part on the relevancy factor, determining a ranking of the elements by relevance to the first user and a most relevant one of the elements.

2. The method of claim 1, further comprising:
   (h) receiving a request from the first server for an indication of the ranking and the most relevant one of the elements; and
   (i) sending the indication requested in the request to the first server.

3. The method of claim 2, wherein (h) is effected before (f).

4. The method of claim 2, wherein (h) is a consequence of the first server having received a request for the first network resource from the first user.

5. The method of claim 2, wherein (a), (b), and (h) occur concurrently.

6. The method of claim 2, wherein (f) is effected before (h).

7. The method of claim 2, further comprising, before (i), retrieving the indication requested in (h) from the second database.

8. The method of claim 1, wherein the first network resource is a website and each one of the elements is an indication of a distinct web page.

9. The method of claim 1, wherein the first network resource is a web page and each one of the elements is an indication of at least one of a displayable element and an audible element of the web page.

10. The method of claim 9, further comprising sending to the first server an indication of a web page customized for the first user based on the ranking of the elements.

11. The method of claim 1, wherein the first network resource is a web page and each one of the elements is an indication of a style applicable to the web page.

12. The method of claim 11, wherein each one of the elements includes an indication of a graphical layout.

13. The method of claim 1, wherein the second network resource is a search engine.

14. The method of claim 13, wherein the past interaction includes a submission of a search query.

15. The method of claim 1, wherein the past interaction includes a selection, by at least one of the first user and the second user, of a first element of the second network resource instead of a second element of the second network resource.

16. The method of claim 15, wherein each of the first element and the second element of the second network resource is a search result.

17. The method of claim 1, wherein the relevancy factor further includes a ranking of the first network resource relative to a third network resource according to a criterion.

18. The method of claim 17, wherein the criterion is a search engine ranking criterion.

19. The method of claim 17, wherein the second network resource is a search engine, and further comprising analyzing the ranking of the first network resource relative to the third network resource based on search history statistics.

20. The method of claim 1, wherein the first user is part of a set of users estimated to share a same attribute.

21. The method of claim 1, wherein the indication of the user is an indication of a client device of the user.

22. The method of claim 21, wherein the indication of the client device includes an internet protocol (IP) address of a network interface of the client device.

23. The method of claim 21, wherein the indication of the client device includes an indication of at least one of a manufacturer, model, hardware attribute, and software attribute of the client device.

24. The method of claim 23, wherein the hardware attribute includes at least one of a size and a resolution of a display of the client device.

25. The method of claim 23, wherein the software attribute includes at least one of an operating system of the client device, an application installed on the client device, and a user setting of at least one of the operating system and the application.

26. The method of claim 25, wherein the user setting includes an indication of at least one of a geographical region and a language.

27. A server for ranking elements of a first network resource for a first user, the first network resource being hosted by a hosting server, the server comprising:
    a communication interface structured and configured to communicate with the hosting server via a communications network;
    at least one computer processor operationally connected with the communication interface and structured and configured to:
        (a) receive an indication of the elements from the hosting server;
        (b) receive an indication of the first user;
        (c) based on at least one of the indication of the elements and the indication of the first user, acquire information about a past interaction of the first user with a second network resource, the second network resource being distinct from the first network resource;
        (d) based on the information about the past interaction, generate a first context information associated with the first user;
        (e) based on the first context information associated with the first user, determine a second user, the second user associated with a second context information that matches, at least partially, the first context information; the second context information containing a relevancy factor that is not contained within the first context information; and
        (f) based at least in part on the relevancy factor, determine a ranking of the elements by relevance to the first user and a most relevant one of the elements.

28. A non-transitory computer-readable information storage medium storing program instructions that, when executed by a computer processor of a server in communication via a communications network with a hosting server hosting a first network resource, effect:
    (a) receiving an indication of elements of the first network resource from the hosting server;
    (b) receiving an indication of a first user in respect of whom the elements are to be ranked;
    (c) based on at least one of the indication of the elements and the indication of the first user, acquiring information about a past interaction of the first user with a second network resource, the second network resource being distinct from the first network resource;
    (d) based on the information about the past interaction, generating a first context information associated with the first user;
    (e) based on the first context information associated with the first user, determining a second user, the second user associated with a second context information that matches, at least partially, the first context information; the second context information containing a relevancy factor that is not contained within the first context information; and
    (f) based at least in part on the context information, determining at least one of a ranking of the elements by relevance to the first user and a most relevant one of the elements.

* * * * *